(12) United States Patent
Adkisson et al.

(10) Patent No.: US 7,457,888 B2
(45) Date of Patent: Nov. 25, 2008

(54) DATA DELIVERY BASED ON A SELECT DATA DELIVERY PERFORMANCE PARAMETER IN A DATA PROCESSING SYSTEM

(75) Inventors: Richard W. Adkisson, Dallas, TX (US); Craig W. Warner, Addison, TX (US); Huai-Ter Victor Chong, Dallas, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 491 days.

(21) Appl. No.: 10/756,448

(22) Filed: Jan. 12, 2004

(65) Prior Publication Data

US 2005/0154806 A1 Jul. 14, 2005

(51) Int. Cl.
*G06F 3/00* (2006.01)
(52) U.S. Cl. .............................. 710/14; 710/15; 710/29; 710/36
(58) Field of Classification Search .................... 710/35
See application file for complete search history.

(56) References Cited

U.S. PATENT DOCUMENTS

| | | | |
|---|---|---|---|
| 6,912,598 B1* | 6/2005 | Bedarida et al. ................ 710/7 |
| 2002/0018395 A1* | 2/2002 | McLaury ..................... 365/233 |
| 2003/0159008 A1* | 8/2003 | Sprangle et al. ............. 711/154 |
| 2004/0085956 A1* | 5/2004 | Moriarty et al ............. 370/389 |
| 2004/0090924 A1* | 5/2004 | Giaimo et al. .............. 370/252 |
| 2004/0258039 A1* | 12/2004 | Stephens ..................... 370/349 |

* cited by examiner

*Primary Examiner*—Alan Chen

(57) ABSTRACT

Delivering data from a data input to a data output within a system includes selecting a system performance parameter to be optimized, receiving at the data input a sequence of discrete data words, determining an optimum mode of delivery of the data words to the data output so as to optimize the selected performance parameter, and delivering the data words from the data input to the data output in the determined optimum mode. The optimum mode of delivery may include at least one of an optimum time and sequence of delivery of the data words.

8 Claims, 3 Drawing Sheets

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| @32 | A | | B | | | | C | | D | | | | | | | |
| ASAP | | | | | | | | | | | | | | | | |
| order 0 | A | | B | | | | C | | D | | | | | | | |
| order 2 | | | B | A | | | | | D | C | | | | | | |
| order 4 | | | | | | | C | | D | B | A | | | | | |
| order 6 | | | | | | | | | D | C | B | A | | | | |
| ASAP-BW | | | | | | | | | | | | | | | | |
| order 0 | | | | A | B | | C | | D | | | | | | | |
| order 2 | | | | | B | A | | | D | C | | | | | | |
| order 4 | | | | | | | C | | D | A | B | | | | | |
| order 6 | | | | | | | | | D | C | B | A | | | | |
| Safety | | | | | | | | | | | | | | | | |
| order 0 | | | | | | | | | A | B | C | D | | | | |
| order 2 | | | | | | | | | B | A | D | C | | | | |
| order 4 | | | | | | | | | C | D | A | B | | | | |
| order 6 | | | | | | | | | D | C | B | A | | | | |

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| @32 | A | | B | | C | | D | | | | | | | | | |
| ASAP Mode | | | | | | | | | | | | | | | | |
| order 0 ABCD | A | | B | | C | | D | | | | | | | | | |
| order 2 BADC | | | B | A | | | D | C | | | | | | | | |
| order 4 CDAB | | | | | C | | D | A | B | | | | | | | |
| order 6 DCBA | | | | | | | D | C | B | A | | | | | | |
| ASAP-BW | | | | | | | | | | | | | | | | |
| order 0 | | | | A | B | C | D | | | | | | | | | |
| order 2 | | | | | B | A | D | C | | | | | | | | |
| order 4 | | | | | | C | D | A | B | | | | | | | |
| order 6 | | | | | | | D | C | B | A | | | | | | |
| Safety | | | | | | | | | | | | | | | | |
| order 0 | | | | | | | | A | B | C | D | | | | | |
| order 2 | | | | | | | | B | A | D | C | | | | | |
| order 4 | | | | | | | | C | D | A | B | | | | | |
| order 6 | | | | | | | | D | C | B | A | | | | | |

FIG. 2

|        | 1 | 2 | 3 | 4 | 5 | 6 | 7 | 8 | 9 | 10 | 11 | 12 | 13 | 14 | 15 | 16 |
|--------|---|---|---|---|---|---|---|---|---|----|----|----|----|----|----|----|
| @32    | A |   | B |   |   |   | C |   | D |    |    |    |    |    |    |    |
| ASAP | | | | | | | | | | | | | | | | |
| order 0 | A |   | B |   |   |   | C |   | D |    |    |    |    |    |    |    |
| order 2 |   |   | B | A |   |   |   |   | D | C  |    |    |    |    |    |    |
| order 4 |   |   |   |   |   |   | C |   | D | B  | A  |    |    |    |    |    |
| order 6 |   |   |   |   |   |   |   |   | D | C  | B  | A  |    |    |    |    |
| ASAP-BW | | | | | | | | | | | | | | | | |
| order 0 |   |   |   | A | B |   | C |   | D |    |    |    |    |    |    |    |
| order 2 |   |   |   |   | B | A |   |   | D | C  |    |    |    |    |    |    |
| order 4 |   |   |   |   |   |   | C |   | D | A  | B  |    |    |    |    |    |
| order 6 |   |   |   |   |   |   |   |   | D | C  | B  | A  |    |    |    |    |
| Safety | | | | | | | | | | | | | | | | |
| order 0 |   |   |   |   |   |   |   |   | A | B  | C  | D  |    |    |    |    |
| order 2 |   |   |   |   |   |   |   |   | B | A  | D  | C  |    |    |    |    |
| order 4 |   |   |   |   |   |   |   |   | C | D  | A  | B  |    |    |    |    |
| order 6 |   |   |   |   |   |   |   |   | D | C  | B  | A  |    |    |    |    |

FIG. 3

DATA DELIVERY BASED ON A SELECT DATA DELIVERY PERFORMANCE PARAMETER IN A DATA PROCESSING SYSTEM

BACKGROUND

Computer and other data processing systems often need to transfer data, usually in the form of data words, between various parts of the system as fast as possible to reduce latency and increase system performance. Some data can arrive at a given location within the system at unpredictable times, whereas other data, from another location within the system, can arrive more predictably. Different arrival times lead to gaps between the data words, and require the data words to be buffered and, in some cases, put into a predetermined sequence before they are passed to the given location. Buffering and sequencing the data can increase the time it takes the data to move from one location within the system to another and contributes to latency. The performance of such systems can be optimized if the data words are transferred at times and in a sequence that optimize a selected system parameter such as latency, bandwidth, or safety, rather than simply buffering the data words and then transferring them at one time.

SUMMARY

In its broad aspects, the invention encompasses a method of delivering data from a data input to a data output within a system, and comprises selecting a system performance parameter to be optimized, receiving at the data input a sequence of discrete data words, determining an optimum mode of delivery of the data words to the data output so as to optimize the selected performance parameter, and delivering the data words from the data input to the data output in the determined optimum mode. The optimum mode of delivery may include at least one of an optimum time and sequence of delivery of the data words.

In one embodiment, the invention encompasses a method of delivering data from a data input to a data output within a system, comprising receiving at the data input a sequence of discrete data words, and delivering each data word to the data output as soon as possible after the data word is received at the data input in order to minimize latency. The data words may also, if desired, be arranged into a preselected sequence before being delivered to the data output.

In another embodiment, the invention encompasses a method of delivering data from a data input to a data output within a system, including receiving at the data input a sequence of discrete data words comprising a data packet, holding at least one of the data words first received at the data input in a queue until additional data words comprising the data packet are received at the data input, delivering the data words in the queue from the queue to the data output as the additional data words comprising the data packet are received at the data input with minimum time gaps between said data words and delivering the additional data words substantially directly from the data input to the data output as soon as possible after the additional data words are received at the data input to maximize bandwidth. The data words may also, if desired, be arranged into a preselected sequence before being delivered to the data output.

In yet another embodiment, the invention encompasses a method of delivering data from a data input to a data output within a system, and comprises the steps of receiving at the data input a sequence of discrete data words, holding each of the data words received in storage until all data words comprising the data packet have been received, and delivering the data words from storage to the data output with minimum time gaps between the data words to maximize safety. The data words may also, if desired, be arranged into a preselected sequence before being sent from storage to the data output.

BRIEF DESCRIPTION OF THE DRAWINGS

To illustrate the invention, there is shown in the drawings a form presently preferred; it being understood, however, that the invention is not limited to the precise arrangements and instrumentalities shown.

FIGS. 2 and 3 illustrate the timing and sequence of delivery of data according to an embodiment of the invention.

DETAILED DESCRIPTION

Figure 1:
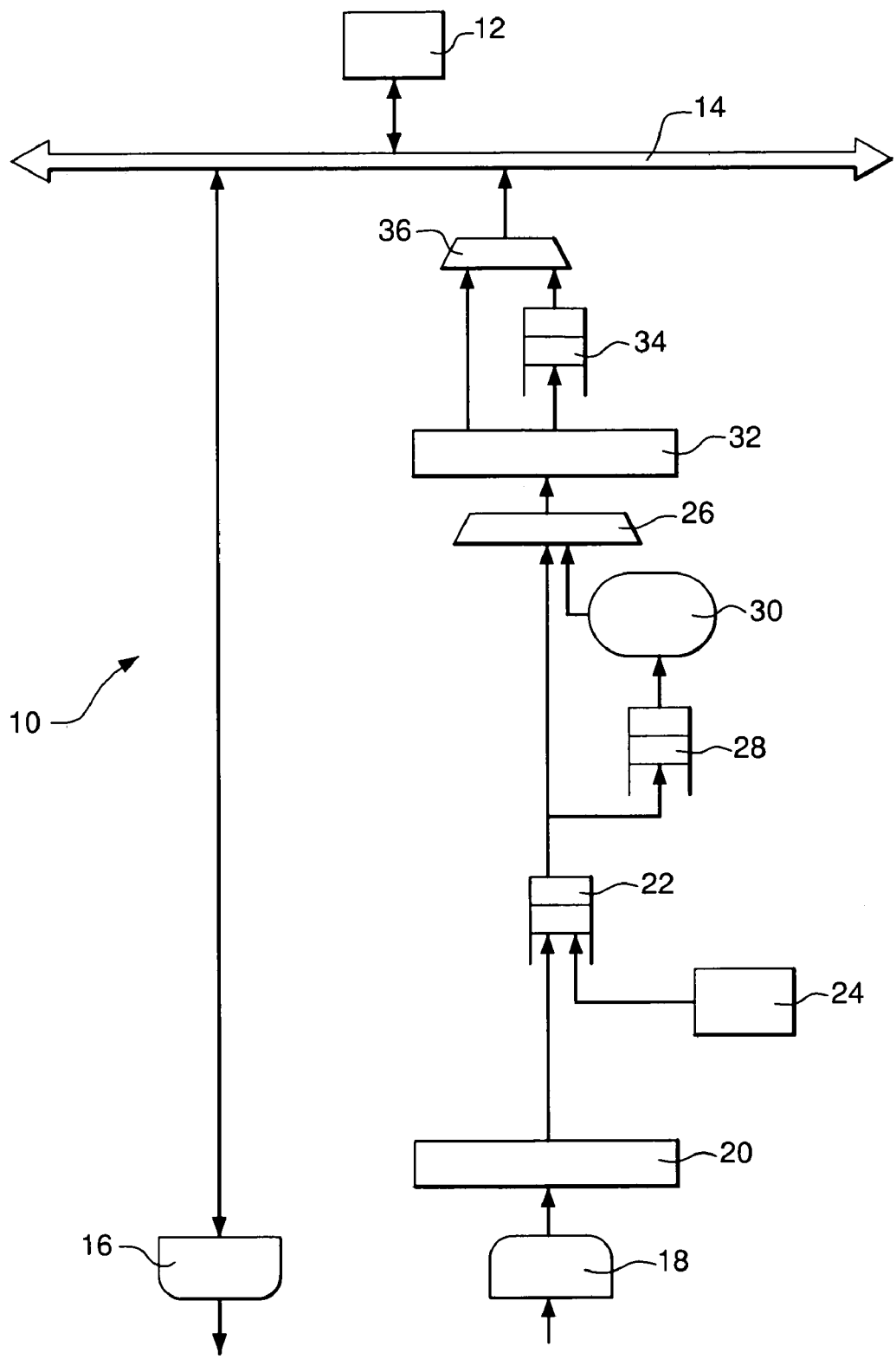
FIG. 1 illustrates in simplified form a block diagram of a system according to an embodiment of the invention and through which the method of the invention may be carried out.

Referring to the drawings, wherein like numerals indicate like elements, there is illustrated in FIG. 1 a system 10 that receives and processes data. In the illustrated embodiment, the system 10 includes a processor 12 in data communication with a data bus 14. Data bus 14 typically connects processor 12 to other system resources, such as main processing units (MPUs), central agent controllers, input/output (I/O) processing agents, and memory units. In the context of the invention, "processor" includes, but is not limited to, central processing units (CPUs) and I/O processing units.

Processor 12 receives data from bus 14, performs operations on the data, and outputs data to bus 14. When processor 12 requires data from a source external to it, it sends a request for data via link output 16. Data being sent to processor 12, including data requested by processor 12, is received at link input 18. Typically, data received and output by processor 12 are in the form of individual data words, which may be grouped into data packets. For example, a data packet may consist of four individual data words, designated arbitrarily as A, B, C, and D, in a predetermined sequence, and a header (the portion of a packet that precedes the actual data and that contains source and destination addresses, error checking, and other fields), designated arbitrarily as H.

Data passes from link input 18 to a synchronizer 20. Synchronizer 20 synchronizes data between different clock domains. For example, link input 18 may be operating at a clock frequency of 300 MHz, whereas other system components downstream from link input 18 may be running at a different clock frequency, for example, 200 MHz. Synchronizer 20 can insert or remove gaps between data words based on clock frequency, so that data arriving at link input 18 is sent downstream at the proper times for downstream components. Of course, if all system components operate at the same clock frequency, synchronizer 20 becomes unnecessary and can be omitted. Synchronized data from synchronizer 20 next move to queue 22. A queue is a first-in, first-out data structure used to store the data words. Data words are added to the "tail" of the queue and taken off the "head."

Data words may also be placed into queue 22 by memory unit 24. Data required by processor 12 may, in many cases, be data stored in a memory unit such as memory unit 24, rather than data that must be requested from other parts of system 10 via link output 16. Although for simplicity a single queue 22 is illustrated, in practice there may be one queue to receive data from synchronizer 20 and a separate queue to receive data from memory unit 24.

In FIG. 1, connections between individual system elements are shown using a single line for simplicity of presentation. However, in many cases, each line in reality will consist of multiple wires, and each wire will carry multiple data channels. The invention is not limited to a particular number of individual wires or channels. The data channels are combined on each line using time-division multiplexing (TDM). As those skilled in the art will understand, TDM assigns specific time intervals to data in individual channels carried on a line, so that for any specific interval only data for a specific individual channel is present on the line. In the next interval, only data for a different individual channel is present on the line. Queue 22 is used to separate data into individual channels by clocking out data words at the time intervals for their respective channels.

Data words taken off the head of queue 22 may go directly to a multiplexer 26 or to another queue 28. Data is sent to queue 28 and then to processor 30 when special packet processing by processor 30 is required. Special packet processing may include error correction and data formatting, if necessary. For example, if only half a data word is valid, special packet processing might include duplicating data. After special packet processing, the data from processor 30 move to multiplexer 26. Multiplexer 26 combines data from queue 22 and processor 30 into a single TDM data stream, which is sent to synchronizer 32. Synchronizer 32, like synchronizer 20, is provided to accommodate differences in clock frequency between components upstream from synchronizer 32 and components downstream from synchronizer 32, including storage unit 34 and multiplexer 36, described below, and bus 14. However, if all of the system components run at the same clock frequency, synchronizer 32 becomes unnecessary and can be omitted.

Synchronized data from synchronizer 32 then moves either to storage unit 34 or to multiplexer 36. Storage unit 34 may be a latch array or a register array, so that data words can be read out in any order, including an order different from the order in which the data words were written into storage unit 34. Multiplexer 36 combines data from storage unit 34 and synchronizer 32 into a single TDM data stream, which is sent to bus 14 and, in turn, processor 12.

The system illustrated in FIG. 1 allows data to be delivered from a data source, such as link input 18 or memory unit 24, to processor 12 in one of three different modes, each of which allows the optimization of a different system performance parameter.

ASAP Mode

The ASAP mode delivers data from a source, such as link input 18 or memory unit 24, to processor 12 as soon as possible. The system performance parameter optimized in the ASAP mode is latency. Latency is greatly reduced by delivering data as soon as possible. In the ASAP mode, data words that are part of a data packet received at link input 18 move along a path from link input 18 to synchronizer 20, from synchronizer 20 to queue 22, from queue 22 to multiplexer 26, from multiplexer 26 to synchronizer 32, from synchronizer 32 to multiplexer 36, and from multiplexer 36 to bus 14 and processor 12. This is the most direct path from link input 18 to processor 12. Alternatively, or additionally, data from memory unit 24 are read out sequentially and sent to queue 22, from queue 22 to multiplexer 26, from multiplexer 26 to synchronizer 32, from synchronizer 32 to multiplexer 36, and from multiplexer 36 to bus 14 and processor 12. In the ASAP mode, data words are delivered to multiplexer 36 as soon as possible after they are received. In the ASAP mode, no provision is made for dealing with time gaps between the data words.

ASAP-BW Mode

Although the ASAP mode optimizes latency, it may not be optimal from the point of view of bandwidth. In the ASAP mode, there may be long time gaps between data words received at link input 18. Long time gaps between data words means idle data bus time, which contributes to reduced system bandwidth. The ASAP-BW mode attempts to optimize bandwidth, while still reducing latency. In the ASAP-BW mode, data words are held for a time and then delivered together, with no gaps, unless there is a very large gap between data words, such as might occur during a retry.

Data arrival times are typically known, based on the source of the data words. From known arrival times, the system sends the data words such that the last word to arrive is sent immediately from synchronizer 32 through multiplexer 36 and onto bus 14. The last data word is always sent as soon as it is received. By knowing the expected, or typical, way the data words will arrive, the arrival of the last data word can be anticipated and delivery of the data can be optimized for sending the last data word immediately upon its arrival.

At least one of the data words first received at link input 18, typically the first data word in a data packet, is held for a time in storage unit 34 until additional data words in the data packet arrive at link input 18. Thus, the first data word follows a path from link input 18 to synchronizer 20, to queue 22, to multiplexer 26, to synchronizer 32, and to storage unit 34. There, the first data word is held until additional data words in the data packet are received at synchronizer 32. As the additional data words are received, the data word or data words in the data packet that are being held in storage unit 34 are clocked out to multiplexer 36, and onto bus 14 for delivery to processor 12. The additional data words received at link input 18 follow a path from link input 18 to synchronizer 20, to queue 22, to multiplexer 26, to synchronizer 32, and from there either directly to multiplexer 36 and onto bus 14 for delivery to processor 12, or to storage unit 34 and then to multiplexer 36.

In the ASAP-BW mode, the data words first received at link input 18 are held in storage unit 34 only as long as it takes for the remaining data words in the data packet to arrive at synchronizer 32. Although this delays the delivery of the first received data words, the delay is only as long as necessary to anticipate the arrival of all of the data words in the data packet and eliminate the time gaps between them before delivering all of the data words together, with minimum time gaps, to processor 12. Eliminating the time gaps between words reduces idle processing time in processor 12 and thus optimizes bandwidth. As additional data words arrive at link input 18, the additional data words are delivered as soon as possible after they are received. This permits at least some reduction in latency, compared to holding all of the data words before delivering them to processor 12. Thus, while the system performance parameter optimized by the ASAP-BW mode is bandwidth, the ASAP-BW mode also offers improvement in latency.

Safety Mode

The Safety mode, which may also be thought of as a "no idle" mode, always delivers data words in a data packet together, with substantially no time gaps, to optimize system safety. By "safety" is meant a reduced risk of problems in processing the data words, such as in a CPU. Most systems work fine when data words comprising a data packet are sent together. Many will also work even with embedded idle cycles in the data packet delivered to the CPU. However, in some cases, for example if there is a bug in the CPU's logic or it cannot accept embedded idle cycles under certain conditions, processing problems can arise. Holding each of the data words received in storage until all data words comprising the data packet have been received and delivering the data words from storage to the data output with substantially no time gaps between the data words minimizes processing problems and, conversely, maximizes "safety" of the processing operations.

In the Safety mode, all data words comprising a data packet are held in storage unit 34 until all of the data words are received. Data words follow a path from link input 18, to synchronizer 20, to queue 22, to multiplexer 26, to synchronizer 32, and to storage unit 34 where they are held until all of the individual data words comprising a data packet are received. Once all of the individual data words are received in storage unit 34, they are then sent to multiplexer 36 and from there to bus 14 and processor 12. The Safety mode differs from the other modes of operation in that all data words must be received before they are sent to processor 12 in order to eliminate time gaps between individual words.

Different modes can be assigned to data from different sources simultaneously. That is, data packets from one source may be delivered in one mode, while data packets from a different source are delivered in a different mode. For example, data from memory unit 24 may be processed in the ASAP mode, while data from link input 18 may be processed in the Safety mode.

Because multiple data channels can be time-division multiplexed onto a single line, it is possible to have different data channels operating in different modes simultaneously. For example, data may be delivered on a first channel in the ASAP mode, while at the same time data on a second channel are delivered in the Safety mode. Any reasonable and practical number of channels can be multiplexed onto a single line without departing from the scope of the invention.

Critical Word Order

In some cases, the sequence of individual data words comprising a data packet is not critical to proper operation of the system. In those cases, latency is improved in all modes by delivering data words in the same sequence in which they are received, without reordering them.

However, in practice, word order within a data packet can be critical. For example, with some bus standards, data words within a data packet must be returned in a specific order, depending on how a data packet is requested by processor 12. In one known standard, for example, four critical word orders are used, designated as Order 0, in which critical word order is ABCD, Order 2, in which critical word order is BADC, Order 4, in which critical word order is CDAB, and Order 6, in which critical word order is DCBA. In all modes according to the present invention, the individual data words comprising a data packet can be put into a preselected sequence before they are sent from the storage unit 34 to multiplexer 36 and bus 14. Critical word order within a data packet can be achieved in all modes by holding some of the data words in storage unit 34 and clocking them out of storage unit 34 in a desired sequence.

Examples of how data words are delivered in desired sequences are illustrated in FIGS. 2 and 3. Referring first to FIG. 2, data for a single channel in a two-channel system are shown on the top line, with individual data words being shown within discrete TDM intervals numbered 1 through 16. In FIG. 2, data words A, B, C, and D are illustrated as being present, in that order, at the output of synchronizer 32, in TDM intervals 1, 3, 5, and 7, respectively. It will be recognized that the data words at the output of synchronizer are in critical word Order 0. Each of the data words is in a discrete TDM interval, and the data words are separated by one interval. The "blank" intervals 2, 4, and 6 separating the data words A, B, C, and D in FIG. 2 represent TDM intervals for the other channel in the two-channel system illustrated.

In the ASAP mode, individual data words are delivered to bus 14 via multiplexer 36 as soon as they appear at the output of synchronizer 32. For critical word Order 0, no reordering of the data words is necessary, and the data words are simply passed directly to multiplexer 36. The individual data words are not delayed but are passed to multiplexer 36 in the same TDM interval in which they appear at the output of synchronizer 32.

For critical word Order 2, however, the data words must be reordered into BADC, so even though data word A is first to appear, it cannot be sent until after data word B appears. In this case, data word A is sent to storage unit 34 until it is needed. As soon as data word B appears at the output of synchronizer 32, it is sent to multiplexer 36, followed immediately by data word A, the next data word in Order 2, which is clocked out of storage unit 34 in the next interval. The third data word in Order 2 is D, so data word C, when it appears at the output of synchronizer 32, must be stored in storage unit 34 until after data word D is received. Thus, there is a delay of two intervals until D appears at the output of synchronizer 32. As soon as it does, it is sent immediately to multiplexer 36, followed by data word C, which is clocked out of storage unit 34 in the next interval.

Similarly, for critical word Order 4 (CDAB), data words A and B are sent to storage unit 34 until after data word D appears at the output of synchronizer 32. Data word C is sent as soon as it appears, followed by data word D when it appears two intervals later, followed immediately by data words A and B, which are clocked out of storage unit 34 in the next two succeeding intervals. For Order 6, data words A, B, and C are all sent to storage unit until data word D appears. As soon as D appears, it is sent to multiplexer 36, followed by data words C, B, and A, which are clocked out of storage unit 34 in that order in the next three succeeding intervals.

In the ASAP-BW mode, the goal is to eliminate time gaps between data words. In the example illustrated in FIG. 2, it is expected that data words A, B, C, and D will appear at the output of synchronizer 32 in that order, in TDM intervals 1, 3, 5, and 7. It will be recognized that the data words will appear in critical word Order 0. For Order 0, reordering of the data words is not necessary, but in the ASAP-BW mode the time gaps between the data words need to be eliminated. Because it is anticipated that data word D will appear at the output of synchronizer 32 in TDM interval 7, data words A, B, and C are stored in storage unit 34 as they appear, and are clocked out to multiplexer 36 in that order beginning with TDM interval 4. That is, data word A is clocked out in interval 4, data word B is clocked out in interval 5, and data word C is clocked out in interval 6, in anticipation of data word D appearing in interval 7. Data word D is sent directly to multiplexer 36 as soon as data word D appears at the output of synchronizer 32. Thus, data words A, B, C, and D are sent to multiplexer 36 in Order 0 in intervals 4, 5, 6, and 7, without time gaps between them.

Similarly, for Order 2 (BADC), data words A, B, and C are stored in storage unit 34 as they appear at the output of synchronizer 32. Assuming that data word D will appear in interval 7, data words B and A are clocked out of storage unit 34 in that order in intervals 5 and 6, data word D is sent in interval 7, and data word C is clocked out of storage unit 34 in interval 8. Thus, data words B, A, D, and C are sent to multiplexer 36 in Order 2 in intervals 5, 6, 7, and 8, without time gaps between them. The same procedure is followed for Order 4 and Order 6, so that for Order 4 data words C, D, A, and B are sent to multiplexer 36 in intervals 6, 7, 8, and 9, and for Order 6 data words D, C, B, and A are sent in intervals 7, 8, 9, 10, all without time gaps between the data words.

In the Safety mode, the goal is to wait until all data words have been received, and to send all of the data words in the desired Order without gaps between them. Thus, as illustrated in FIG. 2, individual data words are held in storage unit 34 until data word D is received in interval 7. At that time, the data words are clocked out of storage unit 34 beginning with interval 7, in desired critical word Order, without gaps between them.

The invention handles unpredictable gaps in data packets including large gaps (caused, for example, by retries of sending link data), where others cannot. Referring to FIG. 3, which is similar to FIG. 2, a data packet comprising data words A, B, C, and D is illustrated, with a three-interval gap between data words B and C. (Although a three-interval gap is illustrated, the invention is capable of handling much larger gaps.) Individual data words for the three modes and four critical word Orders are processed in the same manner as illustrated in FIG. 2, with the exception of delaying the data because of the gap between data words B and C. Thus, data delivery is delayed by two additional intervals compared to the examples illustrated in FIG. 2, but is otherwise delivered in the same manner.

It should be understood that the foregoing examples are intended as illustrative and not as limiting. For example, practical considerations including design constraints, bus protocol timing, and other factors may result in slight variations from the specific examples shown, without departing from the invention.

The invention reduces latency by delivering the data as soon as it is received. The invention also reduces latency by optimizing processor recalls and memory storage to return data in the desired critical data word order to eliminate delays caused by reordering the data words. In all modes, latency can be reduced even while a different system parameter is optimized by having all system elements forward data to the next element in the data path as soon as possible after receipt.

Although the present invention and its advantages have been described in detail, it should be understood that various changes, substitutions, and alterations can be made without departing from the spirit and scope of the invention as defined by the appended claims. Moreover, the scope of the present application is not intended to be limited to the particular embodiments of invention described in the specification. As one of ordinary skill in the art will readily appreciate from the foregoing description, processes, machines, articles of manufacture, compositions of matter, means, methods, or steps presently existing or later to be developed that perform substantially the same function or achieve substantially the same result as the corresponding embodiments described herein may be utilized to implement and carry out the present invention. Accordingly, the appended claims are intended to include within their scope such processes, machines, articles of manufacture, compositions of matter, means, methods, or steps.

The foregoing describes the invention in terms of embodiments foreseen by the invention for which an enabling description was available, notwithstanding that insubstantial modifications of the invention, not presently foreseen, may nonetheless represent equivalents thereto.

What is claimed is:

1. A method of delivering data from a data input to a data output within a system, comprising
    selecting a system performance parameter to be optimized in a system that allows data to be delivered in at least three different modes,
    receiving at the data input a sequence of discrete data words,
    determining an optimum mode of delivery of the data words to the data output so as to optimize the selected performance parameter, and
    delivering the data words from the data input to the data output in the determined optimum mode, wherein:
        when the selected performance parameter to be optimized is latency, the optimum mode comprises delivering each data word immediately after the data word is received at the data input;
        when the selected performance parameter to be optimized is bandwidth, the optimum mode comprises holding at least one of the data words first received at the data input in storage until additional data words comprising the data packet are received at the data input, delivering the data words from storage to the data output as the additional data words comprising the data packet are received at the data input with minimal time gaps between the data words, and delivering the additional data words directly from the data input to the data output immediately after the additional data words are received at the data input; and
        when the performance parameter to be optimized is safety, the optimum mode comprises holding each of the data words received in storage until all data words comprising the data packet have been received, and delivering the data words from storage to the data output with no time gaps between the data words.

2. The method according to claim 1, further comprising reordering the data words into a desired sequence before delivering the data words from the data input to the data output.

3. An apparatus for delivering data from a data input to a data output within a system using the method of claim 1, comprising:
    a data input for receiving a sequence of discrete data words from a plurality of data sources including a link input having unpredictable data arrival times and a memory having predictable data arrival times;
    a data output to which data are delivered; and
    at least one data storage element intermediate the data input and data output for storing individual data words in transit from the data input to the data output for a determined time before delivery to the data output, and at least one path for selectably delivering data to the data output by bypassing said data storage element.

4. A method of delivering data from a data input to a data output within a system, comprising
    selecting a system performance parameter to be optimized in a system that allows data to be delivered in at least three different modes,
    receiving at the data input a sequence of discrete data words,
    selecting a desired sequence of the data words; and
    delivering the data words from the data input to the data output in the determined optimum sequence and time, wherein:
        when the selected performance parameter to be optimized is latency, the optimum mode comprises delivering each data word in the desired sequence immediately after the data word is received at the data input;
        when the selected performance parameter to be optimized is bandwidth, the optimum mode comprises holding at least one of the data words first received at the data input in storage until additional data words comprising the data packet are received at the data input, delivering the data words in the desired sequence, from storage to the data output as the additional data words comprising the data packet are received at the data input with minimal time gaps between the data words, and delivering the additional data words in the desired sequence immediately after the additional data words are received at the data input; and when the performance parameter to be optimized is safety, the optimum mode comprises holding each of the data words received in storage until all data words comprising the data packet have been received, and delivering the data words from storage to the data output in the desired sequence with no time gaps between the data words.

5. A method of delivering data from a data input to a data output within a data processing system that allows data to be delivered in at least three different modes on each of a plurality of multiplexed data channels, comprising selecting a system performance parameter to be optimized for each channel, receiving at the data input of each channel a sequence of discrete data words, determining an optimum mode of delivery of the data words to the data output so as to optimize the selected performance parameter for the associated channel, and delivering the data words from the data input to the data output in the determined optimum mode for each channel, wherein:

when the selected performance parameter to be optimized is latency, the optimum mode comprises delivering each data word immediately after the data word is received at the data input;

when the selected performance parameter to be optimized is bandwidth, the optimum mode comprises holding at least one of the data words first received at the data input in storage until additional data words comprising the data packet are received at the data input, delivering the data words from storage to the data output as the additional data words comprising the data packet are received at the data input with minimal time gaps between the data words, and delivering the additional data words directly from the data input to the data output immediately after the additional data words are received at the data input; and when the performance parameter to be optimized is safety, the optimum mode comprises holding each of the data words received in storage until all data words comprising the data packet have been received, and delivering the data words from storage to the data output with no time gaps between the data words.

6. The method according to claim 5, wherein the mode of delivery is different for at least two of the plurality of data channels.

7. A method of delivering data from a plurality of data sources from a data input to a data output within a data processing system that allows data to be delivered in at least three different modes for each data source, the method comprising selecting a system performance parameter to be optimized for each source, receiving at the data input a sequence of discrete data words in transit to the data output from each source, determining an optimum mode of delivery of the data words to the data output so as to optimize the selected performance parameter for the associated source, and delivering the data words from the data input to the data output in the determined optimum mode for each source, wherein:

when the selected performance parameter to be optimized is latency, the optimum mode comprises delivering each data word immediately after the data word is received at the data input;

when the selected performance parameter to be optimized is bandwidth, the optimum mode comprises holding at least one of the data words first received at the data input in storage until additional data words comprising the data packet are received at the data input, delivering the data words from storage to the data output as the additional data words comprising the data packet are received at the data input with minimal time gaps between the data words, and delivering the additional data words directly from the data input to the data output immediately after the additional data words are received at the data input; and when the performance parameter to be optimized is safety, the optimum mode comprises holding each of the data words received in storage until all data words comprising the data packet have been received, and delivering the data words from storage to the data output with no time gaps between the data words.

8. The method according to claim 7, wherein the mode of delivery is different for at least two of the plurality of data sources.

* * * * *

UNITED STATES PATENT AND TRADEMARK OFFICE
CERTIFICATE OF CORRECTION

PATENT NO.       : 7,457,888 B2
APPLICATION NO.  : 10/756448
DATED            : November 25, 2008
INVENTOR(S)      : Richard W. Adkisson et al.

Page 1 of 1

It is certified that error appears in the above-identified patent and that said Letters Patent is hereby corrected as shown below:

In column 7, line 61, delete "invention" and insert -- inventors --, therefor.

In column 9, line 5, in Claim 4, delete "sequence," and insert -- sequence --, therefor.

Signed and Sealed this

Fourteenth Day of April, 2009

JOHN DOLL
*Acting Director of the United States Patent and Trademark Office*